US009942701B2

(12) United States Patent
Mappus, IV et al.

(10) Patent No.: US 9,942,701 B2
(45) Date of Patent: Apr. 10, 2018

(54) APPARATUS AND METHOD FOR DETECTING OBJECTS AND NAVIGATION

(71) Applicant: AT&T INTELLECTUAL PROPERTY I, LP, Atlanta, GA (US)

(72) Inventors: Rudolph L. Mappus, IV, Plano, TX (US); James Morgan White, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 63 days.

(21) Appl. No.: 15/093,043

(22) Filed: Apr. 7, 2016

(65) Prior Publication Data
US 2017/0295457 A1    Oct. 12, 2017

(51) Int. Cl.
*H04W 4/02*    (2009.01)
*G01C 21/20*    (2006.01)
(Continued)

(52) U.S. Cl.
CPC .............. *H04W 4/02* (2013.01); *A61H 3/061* (2013.01); *G01C 21/20* (2013.01);
(Continued)

(58) Field of Classification Search
CPC .. H04M 1/0202; H04M 1/04; H04M 1/72569; H04M 1/72572; G01S 5/0252;
(Continued)

(56) References Cited

U.S. PATENT DOCUMENTS 6,774,788 B1    8/2004  Balfe et al.
7,366,499 B1    4/2008  Michaelis et al.
(Continued)

FOREIGN PATENT DOCUMENTS

WO    2012114123          8/2012
WO    2012143952 A2      10/2012
WO    2015121846          8/2015

OTHER PUBLICATIONS

"Advanced Dual Mode Access With Full Set of Accessibility Features", Ray N5—Phone and Gaming for Visually Impaired and Blind, Feb. 9, 2016, 6 pages.
(Continued)

Primary Examiner — Jason Holloway
(74) Attorney, Agent, or Firm — Guntin & Gust, PLC; Ralph Trementozzi

(57) ABSTRACT

Aspects of the subject disclosure may include, for example, a method in which a mobile device determines a current position and direction; detects objects within an area including the current position; collects first data regarding the objects; buffers the first data; and transmits the first data to a remote system responsive to the mobile device reaching a boundary of the area. The method also comprises obtaining a map of the area from the remote device; the map includes information based on second data previously collected regarding objects in the area, the second data includes a position indicator and a direction indicator for each of the second objects indexed by the current position, and the remote device aggregates the first data and the second data to generate an updated map of the area. Navigation instructions are generated based on the current position and the map, Other embodiments are disclosed.

20 Claims, 10 Drawing Sheets

(51) Int. Cl.
H04L 29/06    (2006.01)
G06F 17/30    (2006.01)
G01C 21/36    (2006.01)
G06F 3/0488   (2013.01)
A61H 3/06     (2006.01)

(52) U.S. Cl.
CPC ..... *G01C 21/3629* (2013.01); *G01C 21/3641* (2013.01); *G01C 21/3664* (2013.01); *G01C 21/3697* (2013.01); *G06F 3/0488* (2013.01); *G06F 17/30312* (2013.01); *H04L 67/42* (2013.01)

(58) Field of Classification Search
CPC ...... G01S 7/41; G05D 1/0251; G05D 1/0255; H04W 4/02; G06F 3/0488; G06F 17/30312; G01C 21/3664; G01C 21/3697; G01C 21/3629; G01C 21/20; G01C 21/3641; H04L 67/42; A61H 3/061
See application file for complete search history.

(56) References Cited

U.S. PATENT DOCUMENTS

| | | | |
|---|---|---|---|
| 8,027,055 | B2 | 9/2011 | Tobin et al. |
| 8,218,020 | B2 | 7/2012 | Tenchio et al. |
| 8,294,668 | B2 | 10/2012 | Podoloff et al. |
| 8,483,956 | B2 | 7/2013 | Zhang |
| 8,525,874 | B2 | 9/2013 | Willmann et al. |
| 8,605,141 | B2 | 12/2013 | Dorcey et al. |
| 8,606,316 | B2 | 12/2013 | Evanitsky et al. |
| 8,798,534 | B2 | 8/2014 | Rodriguez et al. |
| 8,874,266 | B1 * | 10/2014 | Francis, Jr. ........ G05B 23/0221 700/247 |
| 8,938,360 | B2 | 1/2015 | Kato et al. |
| 8,964,298 | B2 | 2/2015 | Haddick et al. |
| 9,020,697 | B2 | 4/2015 | Ricci et al. |
| 9,037,400 | B2 | 5/2015 | Tolstedt et al. |
| 9,202,353 | B1 | 12/2015 | Sisbot et al. |
| 2011/0125392 | A1 * | 5/2011 | Hao ................ G08G 1/0104 701/118 |
| 2011/0294519 | A1 * | 12/2011 | Laine .................... G01S 5/0236 455/456.1 |
| 2011/0307172 | A1 | 12/2011 | Jadhav et al. |
| 2012/0052820 | A1 * | 3/2012 | Lin ..................... H04B 1/3838 455/90.2 |
| 2012/0166074 | A1 * | 6/2012 | Weng ................... G01C 21/32 701/409 |
| 2013/0131985 | A1 | 5/2013 | Weiland et al. |
| 2013/0325325 | A1 * | 12/2013 | Djugash ........... G01C 21/3415 701/425 |
| 2014/0022121 | A1 * | 1/2014 | Donovan ............. G01C 21/165 342/357.49 |
| 2015/0070479 | A1 | 3/2015 | Yu |
| 2015/0189071 | A1 | 7/2015 | Maxwell et al. |
| 2015/0198455 | A1 | 7/2015 | Chen et al. |
| 2015/0227778 | A1 | 8/2015 | Cervantes |
| 2015/0341756 | A1 * | 11/2015 | Heshmati ............ H04W 4/043 455/456.6 |
| 2016/0003972 | A1 * | 1/2016 | Angermann ......... G05B 15/02 702/5 |

OTHER PUBLICATIONS

"Blind Assistant Free", Google Play, Feb. 9, 2016, 4 pages.
"Echo-Sense CheckMates Glasses Help the Blind to See Greater Independence", Jul. 26, 2014.
Akpan, , "Harnessing the power of aural navigation", Popular Science, Feb. 9, 2015, 4 pages.
Fallah, Navid et al., "The user as a sensor: Navigating users with visual impairments in indoor spaces using tactile landmarks", Conference Paper, May 2012, 9 pages.
Guerrero, et al., "An Indoor Navigation System for the Visually Impaired", Sensors, ISSN 1424-8220, 2012, 8236-8258.
Hague, et al., "The echolocating phone app", Abstract Only, The Journal of the Acoustical Society of America, 134.5, 2013, 4134.
Peng, et al., "A Smartphone-based Obstacle Sensor for the Visually Impaired", Ubiquitous Intelligence and Computing. Springer Berlin Heidelberg, 2010, 590-604.
Tahat, "A wireless ranging system for the blind longcane utilizing a smartphone", IEEE Xplore Digital Libary, Abstract only, 2009.

* cited by examiner

100

200

300

400

500

APPARATUS AND METHOD FOR DETECTING OBJECTS AND NAVIGATION

FIELD OF THE DISCLOSURE

The subject disclosure relates to an apparatus and method for detecting objects and aiding navigation, particularly for vision-impaired persons.

BACKGROUND

Smartphones generally carry significant computational capability in a portable and reasonably rugged form factor. A typical smartphone has features (e.g. a compass, accelerometer, and global positioning sensor) that are useful in navigation.

BRIEF DESCRIPTION OF THE DRAWINGS

Reference will now be made to the accompanying drawings, which are not necessarily drawn to scale, and wherein.

DETAILED DESCRIPTION

Figure 1:
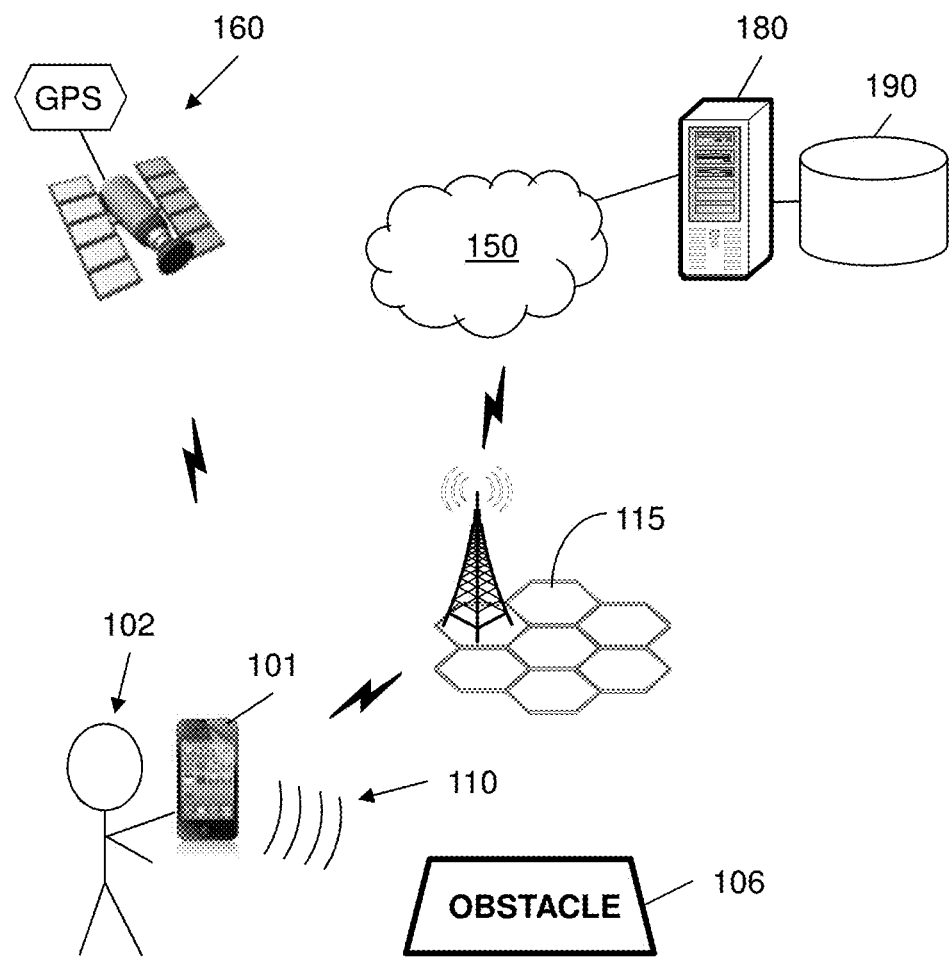
FIG. 1 schematically illustrates an object detection and navigation system according to an embodiment of the disclosure.

The subject disclosure describes, among other things, illustrative embodiments for integrating locally collected data regarding an environment with global positioning data, to provide navigation instructions to a user. Other embodiments are described in the subject disclosure.

One or more aspects of the subject disclosure include a device comprising a processor and a memory that stores executable instructions that, when executed by the processor, facilitate performance of operations. The operations comprise determining a current position and direction for the device; detecting first objects within an area including the current position; collecting first data regarding the first objects; buffering the first data; and transmitting the first data to a remote system. The operations also comprise obtaining a map of the area from the remote system; the map includes information based on second data previously collected regarding second objects in the area; the second data includes a position indicator and a direction indicator for each of the second objects indexed by the current position; and the remote system aggregates the first data and the second data to generate an updated map of the area. The operations further comprise generating navigation instructions based on the current position and the map, and presenting the navigation instructions to a user of the device.

One or more aspects of the subject disclosure include a method comprising determining, by a mobile device comprising a processor, a current position and direction for the device; detecting first objects within an area including the current position; collecting first data regarding the first objects; buffering the first data; and transmitting the first data to a remote device responsive to the mobile device reaching a boundary of the area. The method also comprises obtaining a map of the area from the remote device; the map includes information based on second data previously collected regarding second objects in the area, the second data includes a position indicator and a direction indicator for each of the second objects indexed by the current position, and the remote device aggregates the first data and the second data to generate an updated map of the area. The method further comprises generating navigation instructions based on the current position and the map, and presenting the navigation instructions to a user of the device as an audio signal and/or a display.

One or more aspects of the subject disclosure include a machine-readable storage medium comprising executable instructions that, when executed by a processor, facilitate performance of operations. The operations comprise determining a current position and direction for a mobile device, using a global positioning system. The operations also comprise detecting first objects within an area including the current position, where the area corresponds to an accuracy range of the global positioning system; collecting first data regarding the first objects; buffering the first data; and transmitting the first data to a remote device responsive to the mobile device reaching a boundary of the area. The operations further comprise obtaining a map of the area from the remote device, where the map includes information based on second data previously collected regarding second objects in the area, the second data includes a position indicator and a direction indicator for each of the second objects indexed by the current position, and the remote device aggregates the first data and the second data to generate an updated map of the area. The operations also comprise generating navigation instructions based on the current position and the map, and presenting the navigation instructions to a user of the mobile device.

FIG. 1 schematically illustrates a system 100 according to an embodiment of the disclosure, in which a mobile device 101 carried by a user 102 is used to detect objects near the user and help the user navigate to avoid obstacles (e.g. object 106) in the user's path. In this embodiment, device 101 includes a global positioning system (GPS) receiver that receives signals from GPS 160. Device 101 also has a short-range detection unit for detecting objects within about 10 meters; in this embodiment, device 101 emits ultrasonic signals 110 and detects reflected signals from nearby objects.

Device 101 is also in communication with a remote server 180 via base station 115 and network 150. Server 180 maintains a database 190 of objects, including their locations and physical attributes; server 180 thus can generate a detailed map of features and obstacles near the user, and provide that map to device 101. Device 101 then can prepare navigation instructions for the user.

In an embodiment, the remote server 180 and database 190 form a data processing system comprising multiple servers and storage devices accessible via network 150. Furthermore, the processors of device 101 and/or server 180 may comprise a plurality of processors operating in a distributed processing environment.

Figure 2:
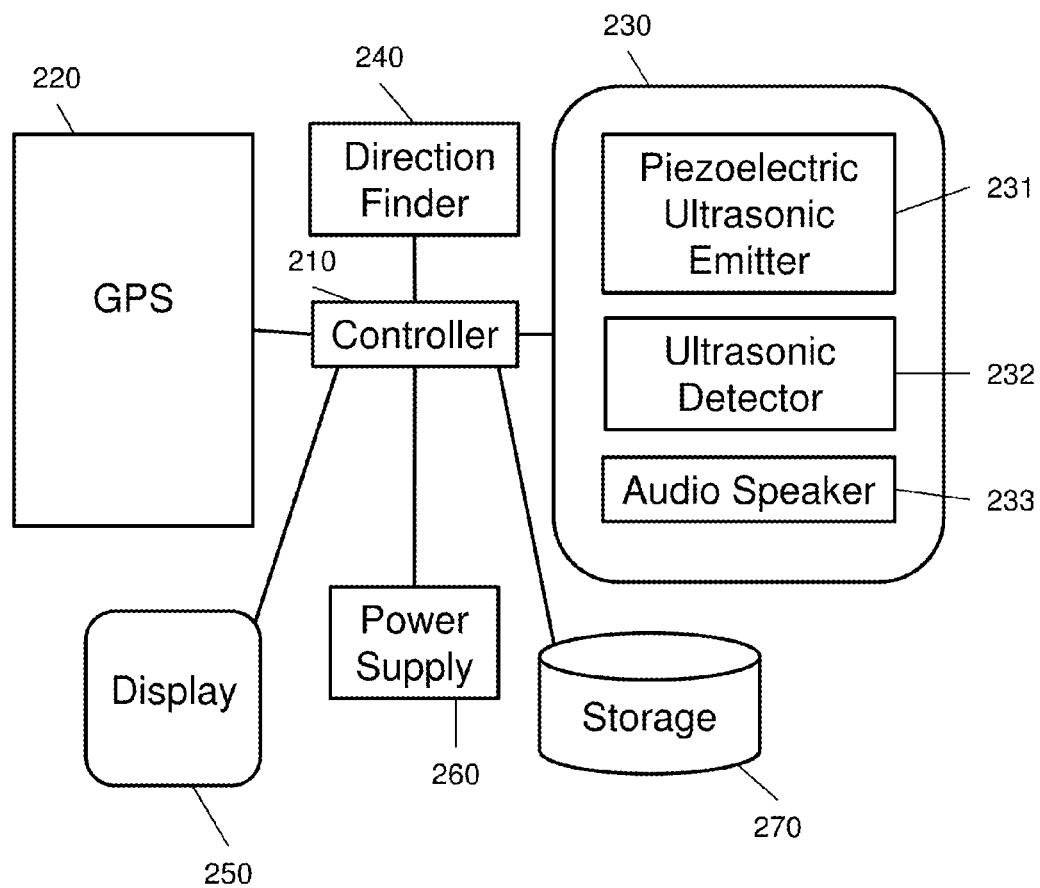
FIG. 2 depicts features of a mobile device used in an illustrative embodiment of the disclosure.

FIG. 2 schematically illustrates a configuration 200 for device 101, in accordance with an embodiment of the disclosure. Device 101 includes a controller 210, direction finder 240, display 250, power supply 260 and storage unit 270. In this embodiment, the device also includes a GPS receiver 220 and an ultrasonic detection unit 230 coupled to the controller. The ultrasonic detection unit has a piezoelectric ultrasonic emitter 231 and an ultrasonic detector 232 for detecting objects by echolocation. Detection unit 230 also has an audio speaker 230 for alerting the user to the presence of nearby obstacles. In this embodiment, the ultrasonic detection unit is integral to the mobile device; alternatively, the ultrasonic detection unit may be a separate unit that transmits readings to the controller 210.

Using the direction finder 240, device 101 can associate an ultrasonic reading with the directional heading and the time at which the reading was taken. In an embodiment, device 101 records ultrasonic readings sampled at a fixed rate, along with time and direction data, for a current location having coordinates determined by the GPS receiver 220. The ultrasonic detection data for a particular GPS location is thus accumulated at the controller 210 and stored (buffered) at storage unit 270. This data can be aggregated with data from previous readings taken at the GPS location (either by device 101 or other devices), as discussed in detail below.

Figure 3:
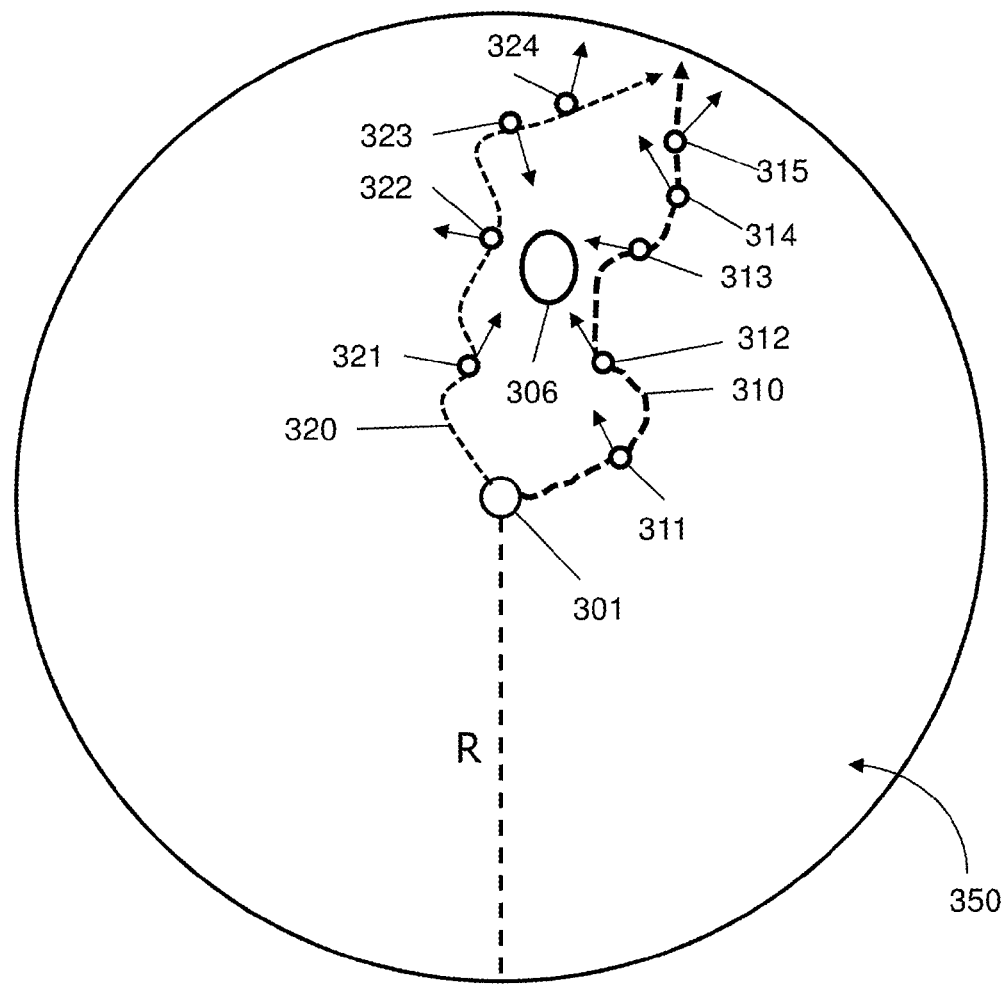
FIG. 3 schematically illustrates a procedure for detecting obstacles and recording their locations, using the system shown in FIG. 1.

FIG. 3 schematically illustrates a procedure 300 in which data relating to the local environment is collected and processed, in accordance with an embodiment of the disclosure. Device 101 (carried by user 102) is initially located at point 301; device 101 records the GPS coordinates for this location. The GPS system typically has a location accuracy in a range of 1-10 meters, which can vary due to environmental conditions and the quality of connections to the local mobile network. As shown in FIG. 3, the GPS system (with GPS receiver 220 located at 301) has a location accuracy R, so that the current GPS coordinates are associated with a generally circular area 350 having radius R.

In this example, user 102 moves along path 310 while pointing device 101 in various directions. Ultrasonic detection unit 230 thus takes readings at points 311-315; the time and direction of each reading (indicated by the arrow at each point 311-315) is also noted. In this embodiment, readings are taken at fixed intervals, so that the distance between data collection points varies with the user's speed. In other embodiments, readings are taken more often as distance to an obstacle decreases. The ultrasonic detection data collected along path 310 (also referred to herein as a 'trace') is buffered at storage 270 until device 101 arrives at the next GPS point (that is, when the outer edge of area 350 is reached, resulting in an update of the GPS coordinates).

The number of possible traces that can be performed, and the number of collection points and device heading directions, in area 350 is virtually unlimited. In an embodiment, data for a given GPS location from multiple traces, performed over time, is uploaded to and aggregated by a remote processor (e.g. server 180 of FIG. 1). For example, another trace 320, performed previously by user 102 or another user, is shown in FIG. 3. Trace 320 includes data collection points 321-324. In this embodiment, data from points 321-324 can be combined with data from points 311-315 to yield a more accurate description of features and obstacles in area 350 than from either trace analyzed separately.

For example, as shown in FIG. 3, an obstacle 306 is detected both in trace 310 and in trace 320. In a specific embodiment, a reflected ultrasonic echolocation signal relating to obstacle 306 is obtained by the device at data collection points 311, 312 and 313, with the device oriented in the directions shown by the arrows. The data is buffered and later uploaded to the remote server 180, and is then aggregated with data previously collected at data collection points 321 and 323. The data can include the location and size of the obstacle, the direction of the obstacle relative to the path traveled, and the time the data was collected. In general, the set of objects detected in trace 310 will overlap with the set of objects detected in trace 320. As shown in FIG. 3, the aggregated data for obstacle 306 represents several different vantage points so that the obstacle can be mapped with improved precision.

Figure 4:
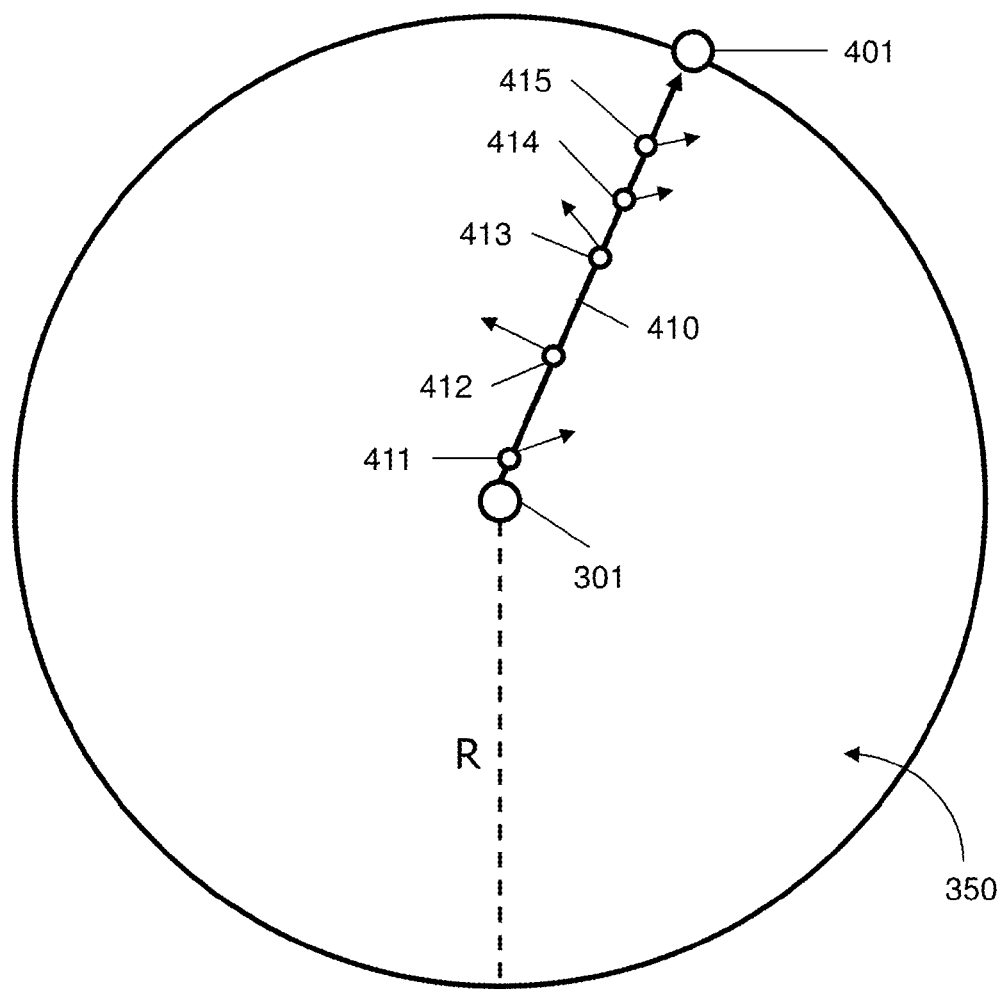
FIGS. 4-5 schematically illustrate navigation using a mobile device with the system shown in FIG. 1, in accordance with embodiments of the disclosure.

FIG. 4 schematically illustrates an embodiment 400 in which trace 310, from point 301 to the edge of area 350, concludes at point 401. When device 101 arrives at GPS point 401, the GPS coordinates for the location of device 101 are updated. In this embodiment, the data buffered in storage 270 is uploaded to server 180. Server 180 executes a procedure in which buffered points 311-315 are projected onto a linear path 410 that includes points 411-415 and extends from GPS point 301 to GPS point 401. In an embodiment, the ultrasonic data and direction data from trace 310 is indexed by the GPS coordinates (in this example, coordinates of point 301) and aggregated with data from other traces (traces performed by device 101 previously or by other devices, previously or concurrently). The aggregated data is then processed to produce a map of features and obstacles for area 350. Each map generated by this procedure is associated with a particular GPS location, and is stored in database 190.

Figure 5:
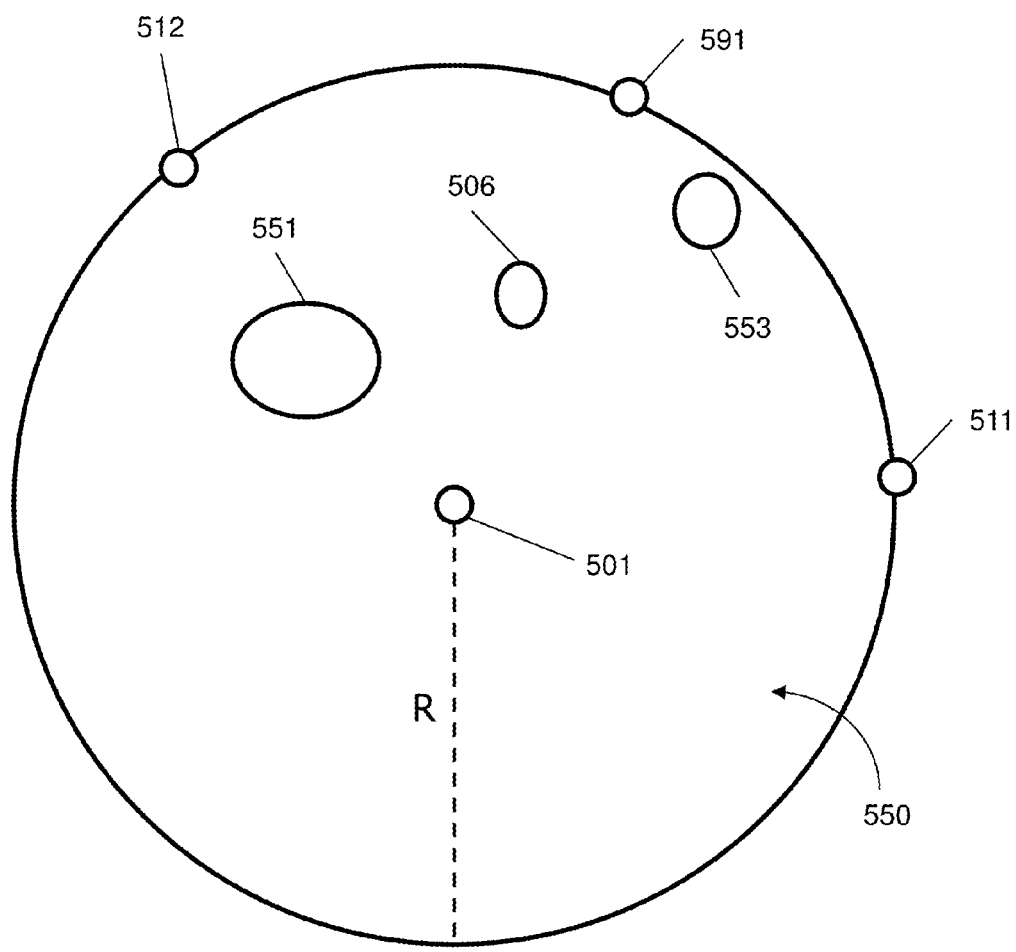

In an embodiment, device 101 downloads the maps indexed by one or more GPS points in the vicinity of the current location. In an embodiment, a device moving from point 501 within area 550 towards point 591 can download maps indexed to points 591, 511 and 512 (see embodiment 500 shown in FIG. 5). The maps provide detailed navigation information for area 550. In an embodiment, device 101 displays a map of area 550 showing obstacles 506, 551, 553; in another embodiment, device 101 provides audio directions for the user based on the downloaded maps, so that the user can avoid the obstacles. In this embodiment, device 101 collects ultrasonic data while moving from point 501 to point 591, which is buffered and later used to further develop maps for area 550.

Figure 6:
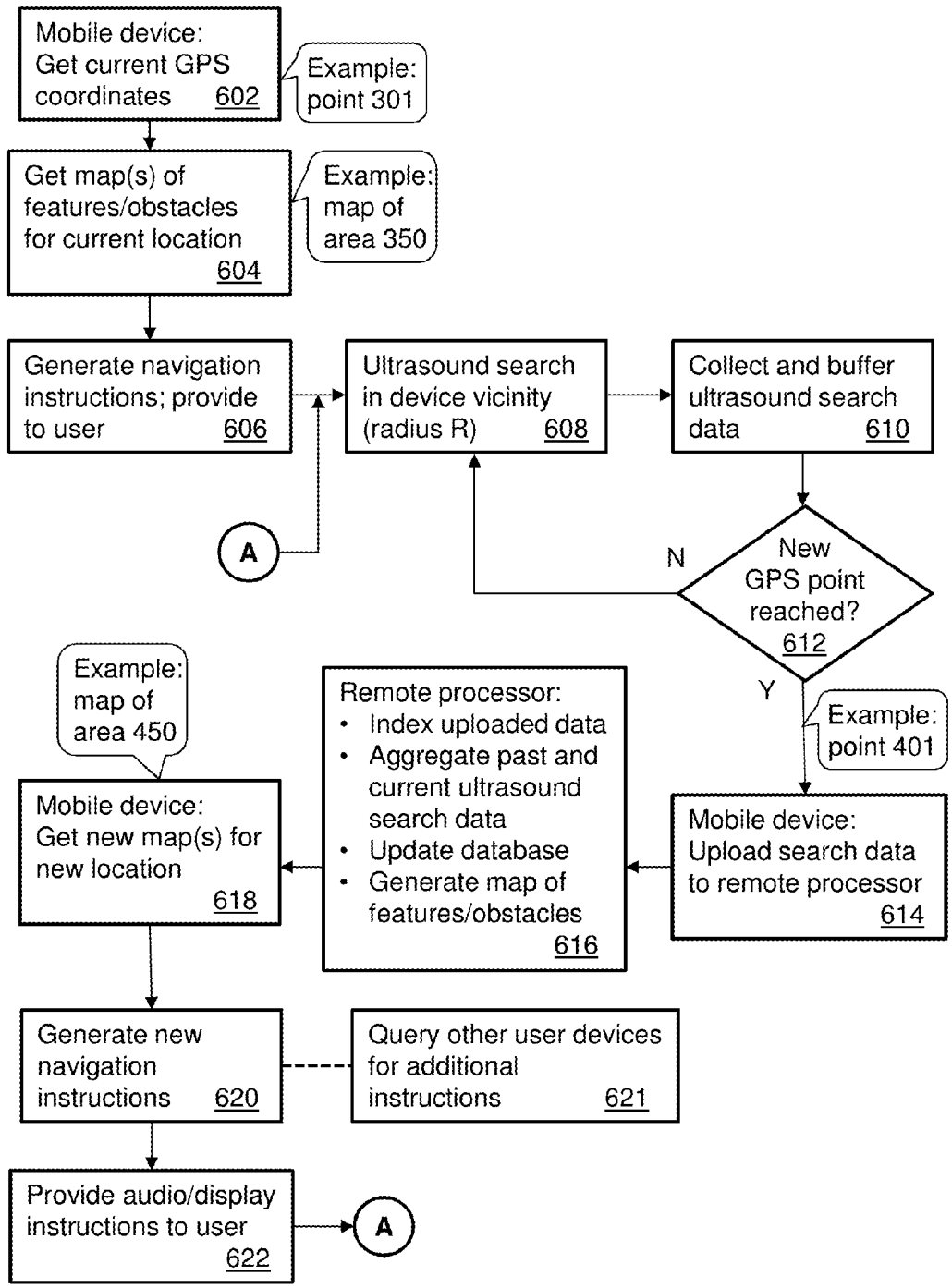
FIG. 6 is a flowchart illustrating a method for collecting and processing data regarding features and obstacles, in accordance with an embodiment of the disclosure.

FIG. 6 is a flowchart illustrating a method 600 for detecting features and obstacles in the vicinity of a user, and for generating a map and navigation instructions, in accordance with an embodiment of the disclosure. In step 602, a device uses a GPS system to obtain coordinates for its current position (for example, location 301). The device then obtains one or more maps of features and/or obstacles associated with the current location (step 604), and generates navigation instructions (step 606) based on the current location, the maps, and a desired destination; the destination may be input in real time by the user of the device. The directions may be provided to the user by the device by a map display and/or an audible sequence of directions.

As the device moves in the vicinity of the starting location (for example, moving in area 350 from point 301 to point 401), the ultrasound detection unit of the device collects data relating to features and obstacles within the area (step 608). This data is collected and buffered at the device (step 610).

When a new GPS point, for example point 401, is reached (step 612), the device uploads the buffered data to a remote processor (step 614). In step 616, the remote processor indexes the uploaded data by the GPS coordinates (for example, data from trace 310 is indexed by the coordinates of location 301); aggregates the uploaded data relating to the GPS location with data previously obtained for that location; updates a database having data relating to the GPS location; and generates a map of features and/or obstacles based on the aggregated data.

In step 618, the device downloads the map indexed by the GPS coordinates for its current location. The device then generates navigation instructions for the area corresponding to the current location (step 620). The device may also send a query to other devices (for example, by a broadcast, messaging using a contact list, or a combination thereof) to obtain navigation instructions for the area (step 621).

The navigation instructions are then provided by the device to the user via display, audio or a combination thereof (step 622). As the device navigates, it continues to collect data which then can be uploaded and used to develop new maps for the area being navigated.

In an embodiment, device 101 can detect other devices in the vicinity and send a specific query regarding features at the location, such as "I have arrived at (address of building)—can you direct me to the main entrance?" An answer can be in the form of a text message, verbal instructions, or a combination thereof, and can also include an image captured by the other device. The device being queried might or might not have ultrasound detection capability. In an embodiment, such additional directions are buffered at the querying device and are uploaded to the remote processor, so that the map for the location can be further enhanced.

In an embodiment, device 101 is provided with a list of other devices present at the GPS location, and can share data in real time with those devices regarding features and/or obstacles at that location, in addition to receiving a map from the remote processor.

It will be appreciated that, in general, a device will move through a succession of GPS locations while collecting ultrasound data (as well as time and direction data) regarding features and/or obstacles along its path of travel, and receive navigation instructions continuously as it moves from one location to the next location.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
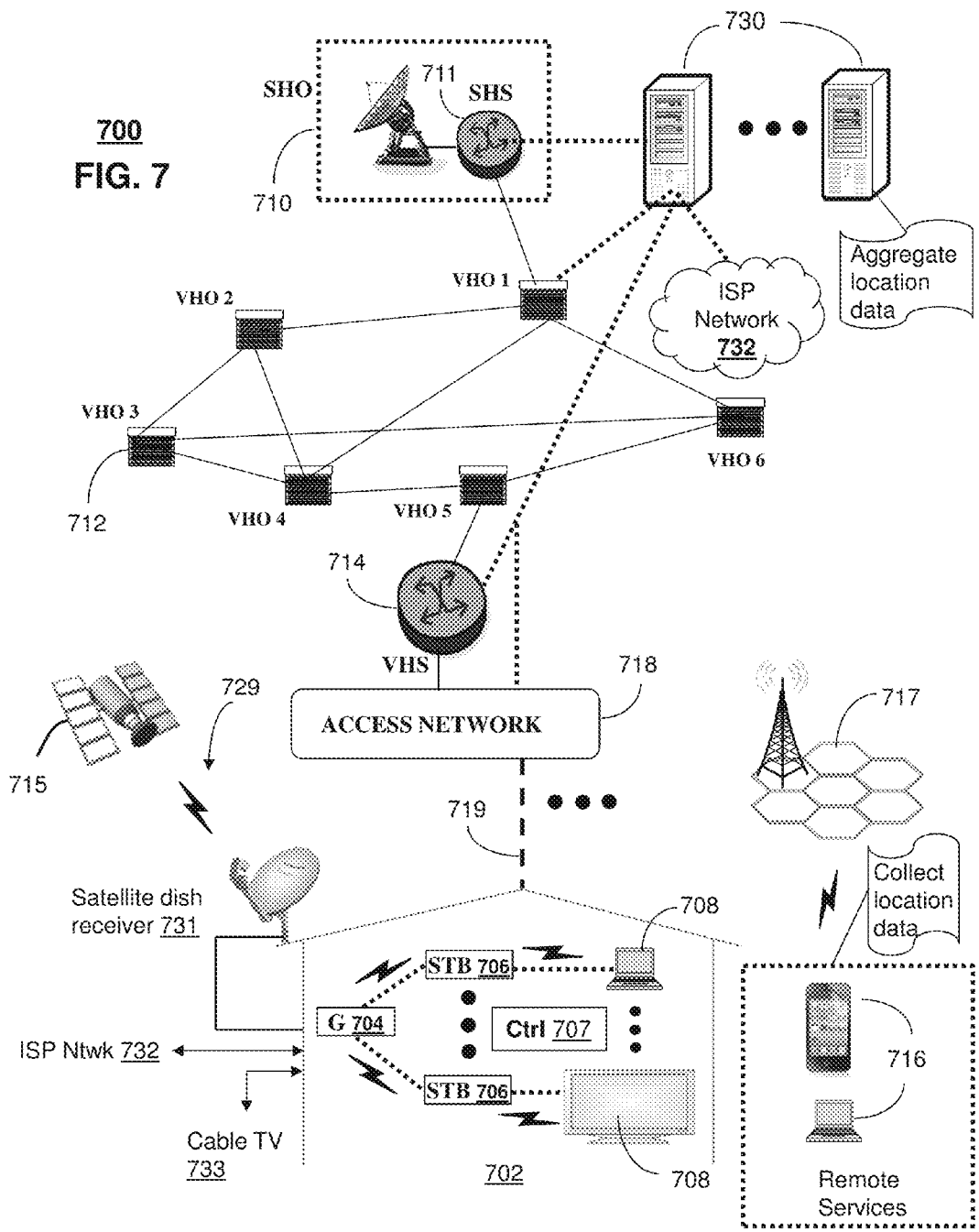
FIGS. 7-8 depict illustrative embodiments of communication systems that provide media services to the mobile devices of FIGS. 1 and 2.

FIG. 7 depicts an illustrative embodiment of a first communication system 700 for delivering media content. The communication system 700 can represent an Internet Protocol Television (IPTV) media system. Communication system 700 can be overlaid or operably coupled with system 100 of FIG. 1 as another representative embodiment of communication system 700. For instance, one or more devices illustrated in the communication system 700 of FIG. 7 can comprise a processor and a memory storing executable instructions that, when executed by the processor, facilitate performance of operations. The operations can comprise determining a current position and direction for the device; detecting first objects within an area including the current position; collecting first data regarding the first objects; buffering the first data; and transmitting the first data to a remote system. The operations can also comprise obtaining a map of the area from the remote system; the map includes information based on second data previously collected regarding second objects in the area; the second data includes a position indicator and a direction indicator for each of the second objects indexed by the current position; and the remote system aggregates the first data and the second data to generate an updated map of the area. The operations can further comprise generating navigation instructions based on the current position and the map, and presenting the navigation instructions to a user of the device.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a navigation server (herein referred to as server 730). The server 730 can use computing and communication technology to perform data processing functions which can include, among other things, the data aggregation and map generation techniques described by method 600 of FIG. 6. For instance, functions of server 730 can be similar to the functions described for server 180 of FIG. 1 in accordance with method 600. The media processors 706 and wireless communication devices 716 can be provisioned with software functions to utilize the services of server 730. For instance, functions of media processors 706 and wireless communication devices 716 can be similar to the functions described for device 101 in FIG. 1 in accordance with method 600.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
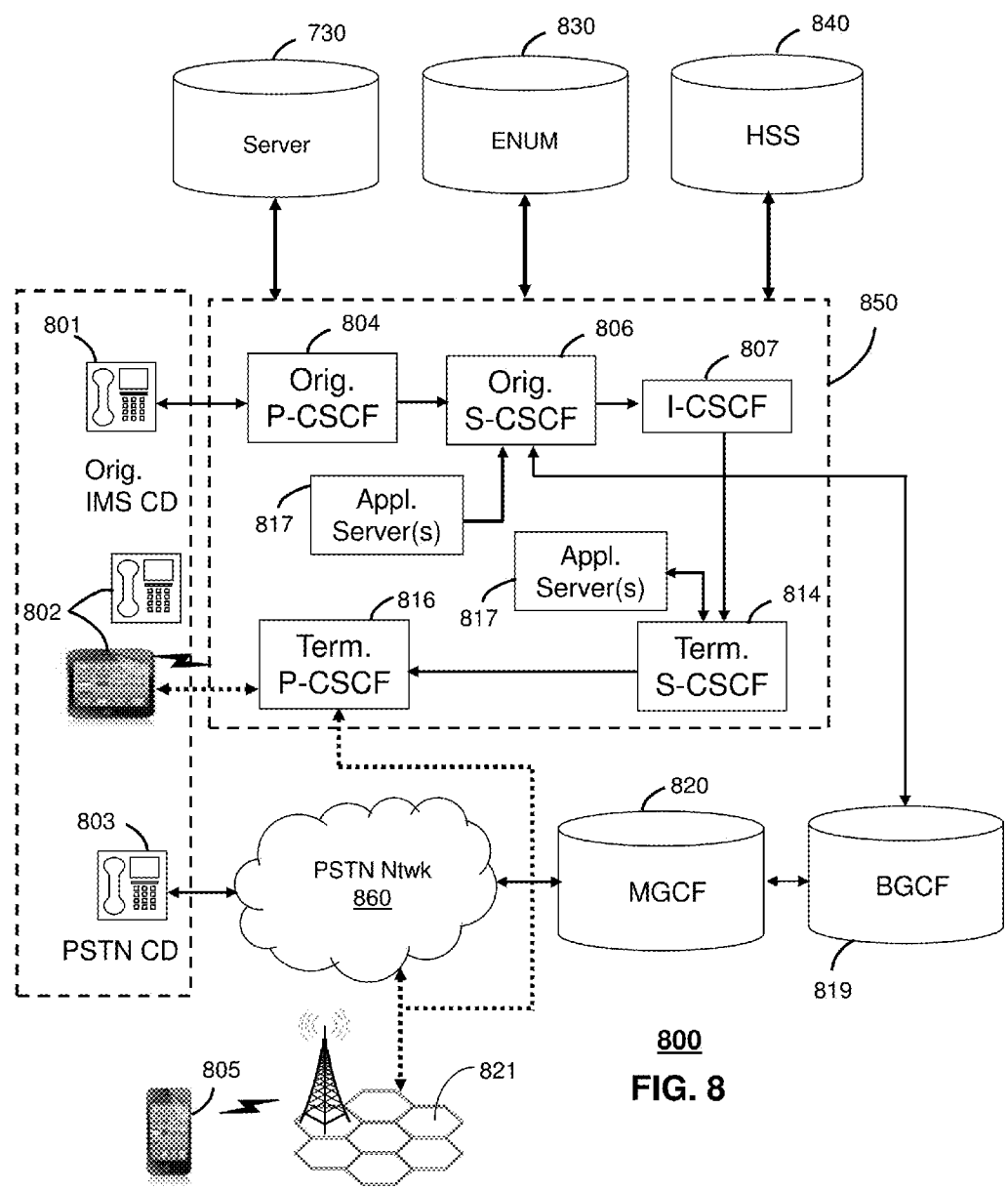

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 100 of FIG. 1 and communication system 700 as another representative embodiment of communication system 700. In particular, elements of system 700 can perform a method comprising determining, by a mobile device comprising a processor, a current position and direction for the device; detecting first objects within an area including the current position; collecting first data regarding the first objects; buffering the first data; and transmitting the first data to a remote device responsive to the mobile device reaching a boundary of the area. The method can also comprise obtaining a map of the area from the remote device; the map includes information based on second data previously collected regarding second objects in the area, the second data includes a position indicator and a direction indicator for each of the second objects indexed by the current position, and the remote device aggregates the first data and the second data to generate an updated map of the area. The method can further comprise generating navigation instructions based on the current position and the map, and presenting the navigation instructions to a user of the device as an audio signal, a display, or a combination thereof.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 730 of FIG. 7 can be operably coupled to communication system 800 for purposes similar to those described above. Server 730 can perform data aggregation and map generation functions and thereby provide navigation services to the CDs 801, 802, 803 and 805 of FIG. 8, similar to the functions described for server 180 of FIG. 1 in accordance with method 600 of FIG. 6. CDs 801, 802, 803 and 805, which can be adapted with software to generate navigation directions to utilize the map generation services of the server 730, similar to the functions described for communication device 101 of FIG. 1 in accordance with method 600 of FIG. 6. Server 730 can be an integral part of the application server(s) 817 performing indexing, aggregating and map generation which can be adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
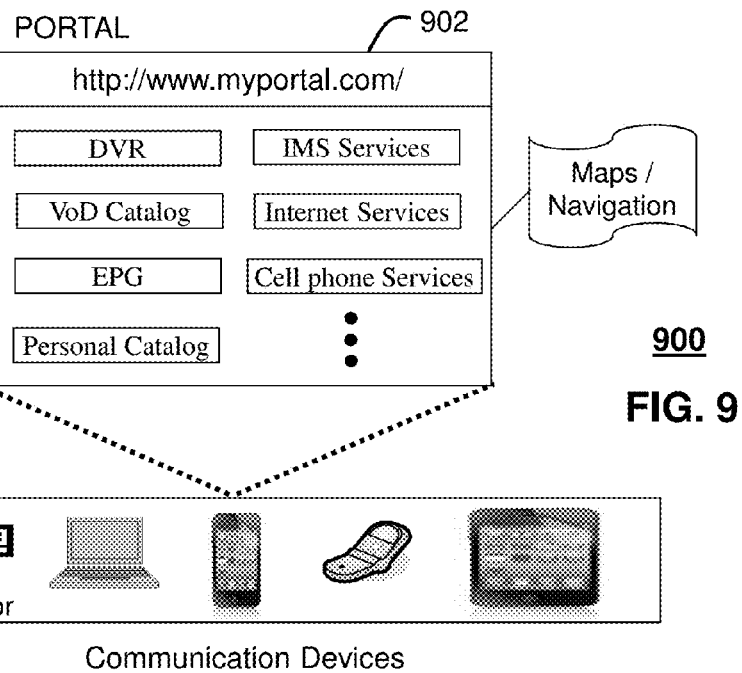
FIG. 9 depicts an illustrative embodiment of a web portal for interacting with the communication systems of FIGS. 7 and 8.

FIG. 9 depicts an illustrative embodiment of a web portal 902 of a communication system 900. Communication system 900 can be overlaid or operably coupled with system 100 of FIG. 1, communication system 700, and/or communication system 800 as another representative embodiment of system 100 of FIG. 1, communication system 700, and/or communication system 800. The web portal 902 can be used for managing services of system 100 of FIG. 1 and communication systems 700-800. A web page of the web portal 902 can be accessed by a Uniform Resource Locator (URL) with an Internet browser using an Internet-capable communication device such as those described in [FIGS. 1 and/or 2] and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications to adapt these applications as may be desired by subscribers and/or service providers of system 100 of FIG. 1, and communication systems 700-800. For instance, users of the services provided by server 180 or server 730 can log into their on-line accounts and provision the server 180 or server 730 with contact information to enable the server to communicate with devices described in FIGS. 1-2, and so on. Service providers can log onto an administrator account to provision, monitor and/or maintain the system 100 of FIG. 1 or server 730.

Figure 10:
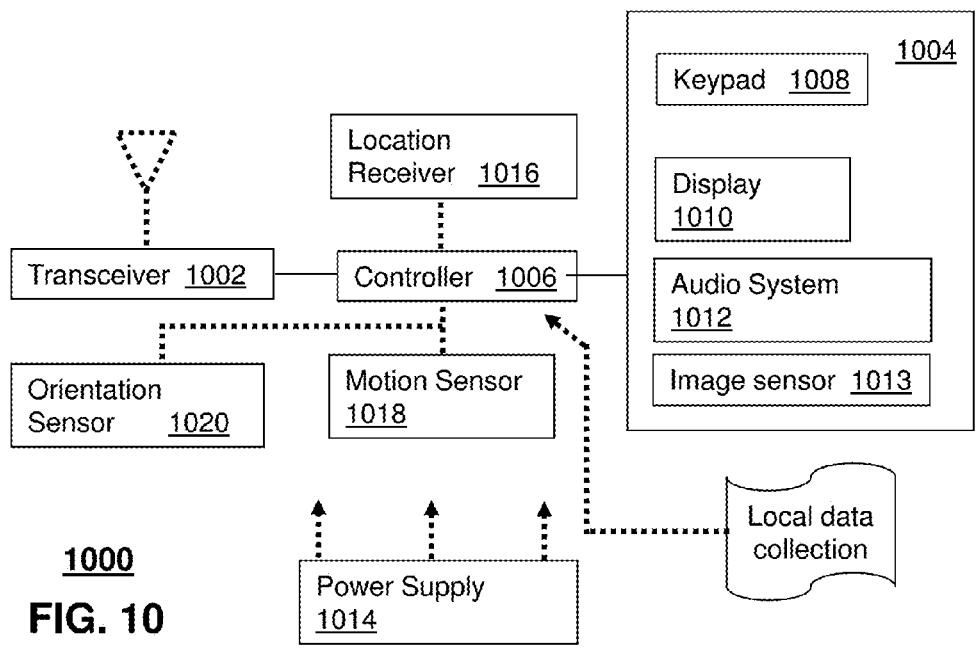
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1 and/or 2, and FIGS. 7-8 and can be configured to perform portions of method 600 of FIG. 6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices shown in FIGS. 1 and/or 2, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in the system of FIG. 1 and communication systems 700-800 of FIGS. 7-8 such as a gaming console and a media player. In addition, the controller 1006 can be adapted in various embodiments to perform data indexing, data aggregation, map generation, and generation of navigation instructions.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
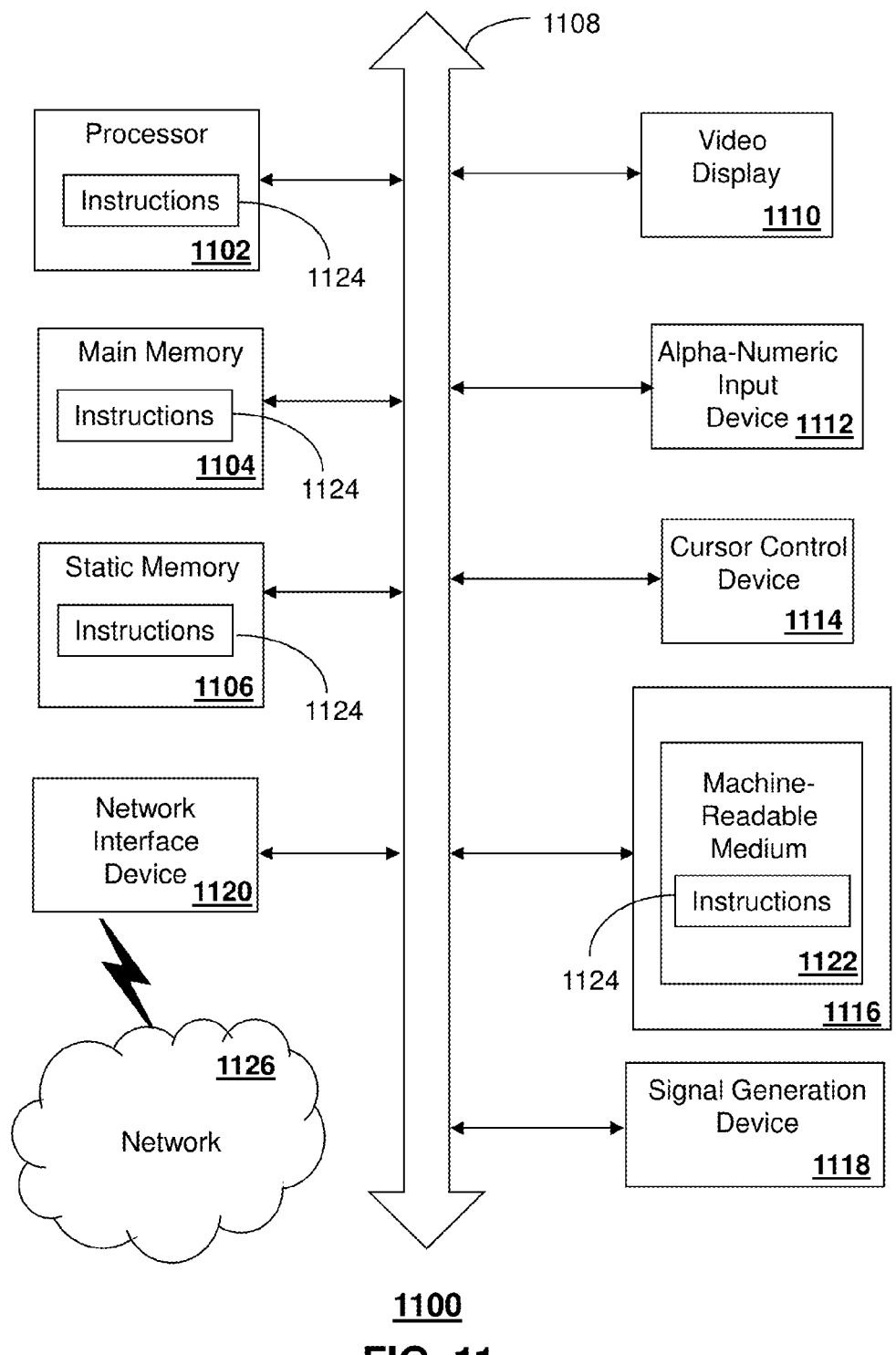
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the server 730, the media processor 706, the server 180, the database 190, and other devices of FIGS. 1-2. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processor; and
   a memory that stores executable instructions that, when executed by the processor, facilitate performance of operations, comprising:
   determining an initial position and direction for the device, wherein the device is a mobile device;
   detecting first objects within an area including the initial position, wherein the detecting is performed while the device moves along a first path from the initial position to a boundary of the area;
   collecting first data regarding the first objects, wherein the collecting is performed at a plurality of first collection points along the first path, a distance between successive first collection points corresponding to a time interval during movement of the device along the first path;
   buffering the first data;
   transmitting the first data to a remote system;
   obtaining a map of the area from the remote system, wherein the map includes information based on second data previously collected regarding second objects in the area, the second data collected at a plurality of second collection points along a second path different from the first path, wherein the second data includes a position indicator and a direction indicator for each of the second objects indexed by the initial position, wherein the remote system aggregates the first data and the second data to generate an updated map of the area;

generating navigation instructions based on the initial position and the map; and presenting the navigation instructions to a user of the device.

2. The device of claim 1, wherein the buffered data is transmitted to the remote system responsive to the mobile device reaching the boundary of the area.

3. The device of claim 2, wherein the initial position is determined using a global positioning system, and wherein the area corresponds to an accuracy range of the global positioning system.

4. The device of claim 3, wherein the accuracy range depends on the initial position.

5. The device of claim 3, wherein an update of the initial position by the global positioning system indicates that the boundary of the area has been reached.

6. The device of claim 1, wherein the objects are detected using an ultrasonic locating system coupled to the device, and wherein the processor comprises a plurality of processors operating in a distributed processing environment.

7. The device of claim 1, wherein at least a portion of the first objects is included in the second objects.

8. The device of claim 7, wherein the first data includes a position of an obstacle in the area and a first direction indicator, and wherein the second data includes the position of the obstacle and a second direction indicator, the first direction indicator and the second direction indicator corresponding respectively to relative bearings of the obstacle in a first detection and a second detection of the obstacle performed at different times.

9. The device of claim 1, wherein the navigation instructions are presented as an audio signal from the device, a display presented at the device, or a combination thereof.

10. The device of claim 1, wherein the operations further comprise sending a query to another device located in the area for additional navigation instructions.

11. A method comprising:
determining, by a mobile device comprising a processor, an initial position and direction for the mobile device;
detecting, by the mobile device, first objects within an area including the initial position, wherein the detecting is performed while the mobile device moves along a first path from the initial position to a boundary of the area;
collecting, by the mobile device, first data regarding the first objects, wherein the collecting is performed at a plurality of first collection points along the first path, a distance between successive first collection points corresponding to a time interval during movement of the mobile device along the path;
buffering, by the mobile device, the first data;
transmitting, by the mobile device, the first data to a remote device responsive to the mobile device reaching the boundary of the area;
obtaining, by the mobile device, a map of the area from the remote device, wherein the map includes information based on second data previously collected regarding second objects in the area, the second data collected at a plurality of second collection points along a second path different from the first path, wherein the second data includes a position indicator and a direction indicator for each of the second objects indexed by the initial position, wherein the remote device aggregates the first data and the second data to generate an updated map of the area;
generating, by the mobile device, navigation instructions based on the initial position and the map; and presenting, by the mobile device, the navigation instructions to a user of the device as an audio signal, a display, or a combination thereof.

12. The method of claim 11, wherein the initial position is determined using a global positioning system, and wherein the area corresponds to an accuracy range of the global positioning system.

13. The method of claim 12, wherein an update of the initial position by the global positioning system indicates that the boundary of the area has been reached.

14. The method of claim 11, wherein the objects are detected using an ultrasonic locating system coupled to the mobile device, and wherein the processor comprises a plurality of processors operating in a distributed processing environment.

15. The method of claim 11, further comprising sending a query to another device located in the area for additional navigation instructions.

16. The method of claim 15, further comprising receiving a response to the query including a captured image of an obstacle in the area.

17. A non-transitory machine-readable storage medium comprising executable instructions that, when executed by a processor, facilitate performance of operations comprising:
determining an initial position and direction for a mobile device, wherein the initial position is determined using a global positioning system;
detecting first objects within an area including the initial position, wherein the area corresponds to an accuracy range of the global positioning system, wherein the detecting is performed while the mobile device moves along a first path from the initial position to a boundary of the area;
collecting first data regarding the first objects, wherein the collecting is performed at a plurality of first collection points along the first path, a distance between successive first collection points corresponding to a time interval during movement of the mobile device along the path;
buffering the first data;
transmitting the first data to a remote device responsive to the mobile device reaching the boundary of the area;
obtaining a map of the area from the remote device, wherein the map includes information based on second data previously collected regarding second objects in the area, the second data collected at a plurality of second collection points along a second path different from the first path, wherein the second data includes a position indicator and a direction indicator for each of the second objects indexed by the initial position, wherein the remote device aggregates the first data and the second data to generate an updated map of the area;
generating navigation instructions based on the initial position and the map; and
presenting the navigation instructions to a user of the mobile device.

18. The non-transitory machine-readable storage medium of claim 17, wherein an update of the initial position by the global positioning system indicates that the boundary of the area has been reached.

19. The non-transitory machine-readable storage medium of claim 17, wherein the objects are detected using an ultrasonic locating system coupled to the device, and wherein the processor comprises a plurality of processors operating in a distributed processing environment.

20. The non-transitory machine-readable storage medium of claim 17, wherein the navigation instructions are presented as an audio signal from the device, a display presented at the device, or a combination thereof.

* * * * *